US012722397B2

(12) United States Patent
Usui et al.

(10) Patent No.: US 12,722,397 B2
(45) Date of Patent: Sep. 1, 2026

(54) IMAGE FORMING APPARATUS

(71) Applicant: KYOCERA Document Solutions Inc., Osaka (JP)

(72) Inventors: Masato Usui, Osaka (JP); Jun Nakano, Osaka (JP); Hiroomi Nakatsuji, Osaka (JP); Naoko Kawashima, Osaka (JP)

(73) Assignee: Kyocera Document Solutions, Inc. (JP)

( * ) Notice: Subject to any disclaimer, the term of this patent is extended or adjusted under 35 U.S.C. 154(b) by 133 days.

(21) Appl. No.: 18/641,313

(22) Filed: Apr. 19, 2024

(65) Prior Publication Data

US 2024/0359484 A1 Oct. 31, 2024

(30) Foreign Application Priority Data

Apr. 27, 2023 (JP) ................................ 2023-072943

(51) Int. Cl.

*B41J 2/21* (2006.01)
*B41J 2/12* (2006.01)
*B41J 29/393* (2006.01)

(52) U.S. Cl.

CPC ............... *B41J 2/2142* (2013.01); *B41J 2/12* (2013.01); *B41J 2/2139* (2013.01); *B41J 2029/3935* (2013.01)

(58) Field of Classification Search

CPC .... B41J 2/2142; B41J 2/16579; B41J 29/393; B41J 2029/3935; B41J 2/2139; B41J 2/2146; B41J 2/12; B41J 2/0451
See application file for complete search history.

(56) References Cited

U.S. PATENT DOCUMENTS

2012/0154477 A1* 6/2012 Yamazaki .............. B41J 2/2146 347/19
2012/0162721 A1 6/2012 Shimizu
2013/0215178 A1 8/2013 Ueshima
2021/0001638 A1* 1/2021 Shibata ................ B41J 2/04508

FOREIGN PATENT DOCUMENTS

JP 2012-139901 7/2012
JP 2013-169760 9/2013

* cited by examiner

*Primary Examiner* — Jannelle M Lebron

(57) ABSTRACT

A control unit causes a recording head to eject ink from nozzles corresponding to an image to be printed. An ejection malfunction nozzle detecting unit causes the recording head to print a test pattern, and detects an ejection malfunction nozzle on the basis of a scanned image of the test pattern. The test pattern includes plural test pattern images such that in each of the plural test pattern images a dot is not formed at a dot position of a target nozzle set as a non ejection nozzle, and the target nozzles of the plural test pattern images are sequentially shifted by one nozzle in a primary scanning direction. Further, the ejection malfunction nozzle detecting unit determines an ejection malfunction nozzle on which ejection deviation occurs, on the basis of density decreasing amounts of respective density decrease parts in the plural test pattern images in the scanned image.

4 Claims, 7 Drawing Sheets

FIG. 7

| | PRINT RESOLUTION (dpi) | SCAN RESOLUTION (dpi) | NUMBER OF EJECTION DEVIATION NOZZLES IN THE TEST PATTERN | NUMBER OF EJECTION DEVIATION NOZZLES CORRECTLY DETERMINED | REQUIRED TIME (sec) |
|---|---|---|---|---|---|
| THIS EMBODIMENT | 1200 | 300 | 86 | 77 (89.5%) | 81 |
| COMPARATIVE EXAMPLE #1<br>ESTIMATING A NOZZLE ON THE BASIS OF A POSITION OF LARGEST DENSITY DECREASING AMOUNT | | 1200 | 90 | 82 (91.1%) | 74 |
| COMPARATIVE EXAMPLE #2<br>ESTIMATING A NOZZLE ON THE BASIS OF A POSITION OF LARGEST DENSITY DECREASING AMOUNT | | 300 | 76 | 23 (30%) | 12 |

IMAGE FORMING APPARATUS

CROSS-REFERENCE TO RELATED APPLICATIONS

This application relates to and claims priority rights from Japanese Patent Application No. 2023-072943, filed on Apr. 27, 2023, the entire disclosures of which are hereby incorporated by reference herein.

BACKGROUND

1. Field of the Present Disclosure

The present disclosure relates to an image forming apparatus.

2. Description of the Related Art

An inkjet image forming apparatus prints a test pattern using a recording head; on the basis of an image of the printed test pattern, detects an ejection malfunction nozzle that can not properly eject ink among nozzles that eject ink in the recording head; and increases an ink amount of an adjacent dot.

Another inkjet image forming apparatus prints as the test pattern a vertical line of a one-dot width using each nozzle and detects a non-ejection nozzle on the basis of existence of the printed vertical line.

However, in the aforementioned image forming apparatus, a non-ejection nozzle can be detected, but even if ejection deviation (deviation of an ink droplet hitting position) occurs on a nozzle, the vertical line is formed by such a nozzle, and therefore, a nozzle of which ejection deviation (deviation of an ink hitting position) occurs is hardly detected. Further, it is possible that a test pattern that includes a band-shaped image having a single density is printed and existence of ejection malfunction is determined on the basis of existence of a density defect in a scanned image of the test pattern, but a nozzle on which ejection malfunction occurs individually and correctly.

SUMMARY

An image forming apparatus according to an aspect of the present disclosure includes a recording head, a control unit, and an ejection malfunction nozzle detecting unit. The recording head is configured to eject ink corresponding to an image to be printed, using arranged nozzles. The control unit is configured to determine nozzles corresponding to the image to be printed and cause the recording head to eject ink from the nozzles. The ejection malfunction nozzle detecting unit is configured to (a) cause the recording head to print a test pattern on a print sheet using the recording head, and (b) detect an ejection malfunction nozzle on the basis of a scanned image of the test pattern. The test pattern includes plural test pattern images of a line shape or a band shape such that in each of the plural test pattern images a dot is not formed at a dot position of a target nozzle by setting the target nozzle as a non ejection nozzle, and the target nozzles of the plural test pattern images are sequentially shifted by one nozzle in a primary scanning direction. Further, the ejection malfunction nozzle detecting unit determines an ejection malfunction nozzle on which ejection deviation occurs, on the basis of density decreasing amounts of respective density decrease parts in the plural test pattern images in the scanned image.

These and other objects, features and advantages of the present disclosure will become more apparent upon reading of the following detailed description along with the accompanied drawings.

BRIEF DESCRIPTION OF THE DRAWINGS

FIG. 7 shows a diagram that explains an example of the number of ejection deviation nozzles correctly determined by the image forming apparatus according to an embodiment of the present disclosure.

DETAILED DESCRIPTION

Hereinafter, embodiments according to an aspect of the present disclosure will be explained with reference to drawings.

Embodiment 1

Figure 1:
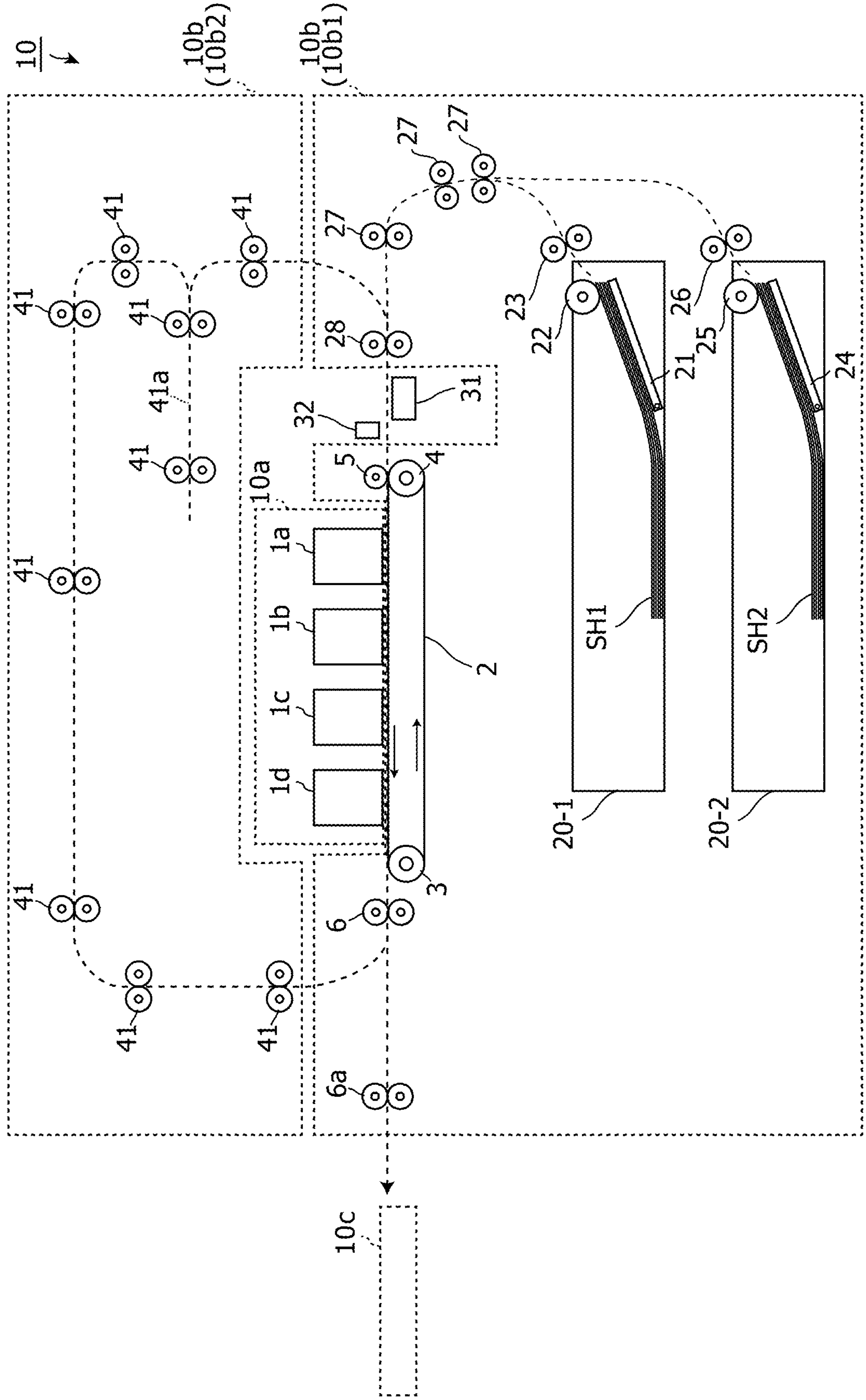
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral.

The image forming apparatus 10 shown in FIG. 1 includes a print engine 10*a* and a sheet transportation unit 10*b*. The print engine 10*a* physically forms an image to be printed on a print sheet (print paper sheet or the like). In this embodiment, the print engine 10*a* is a line-type inkjet print engine.

In this embodiment, the print engine 10*a* includes line-type head units 1*a* to 1*d* corresponding to four ink colors: Cyan, Magenta, Yellow, and Black.

Figure 2:
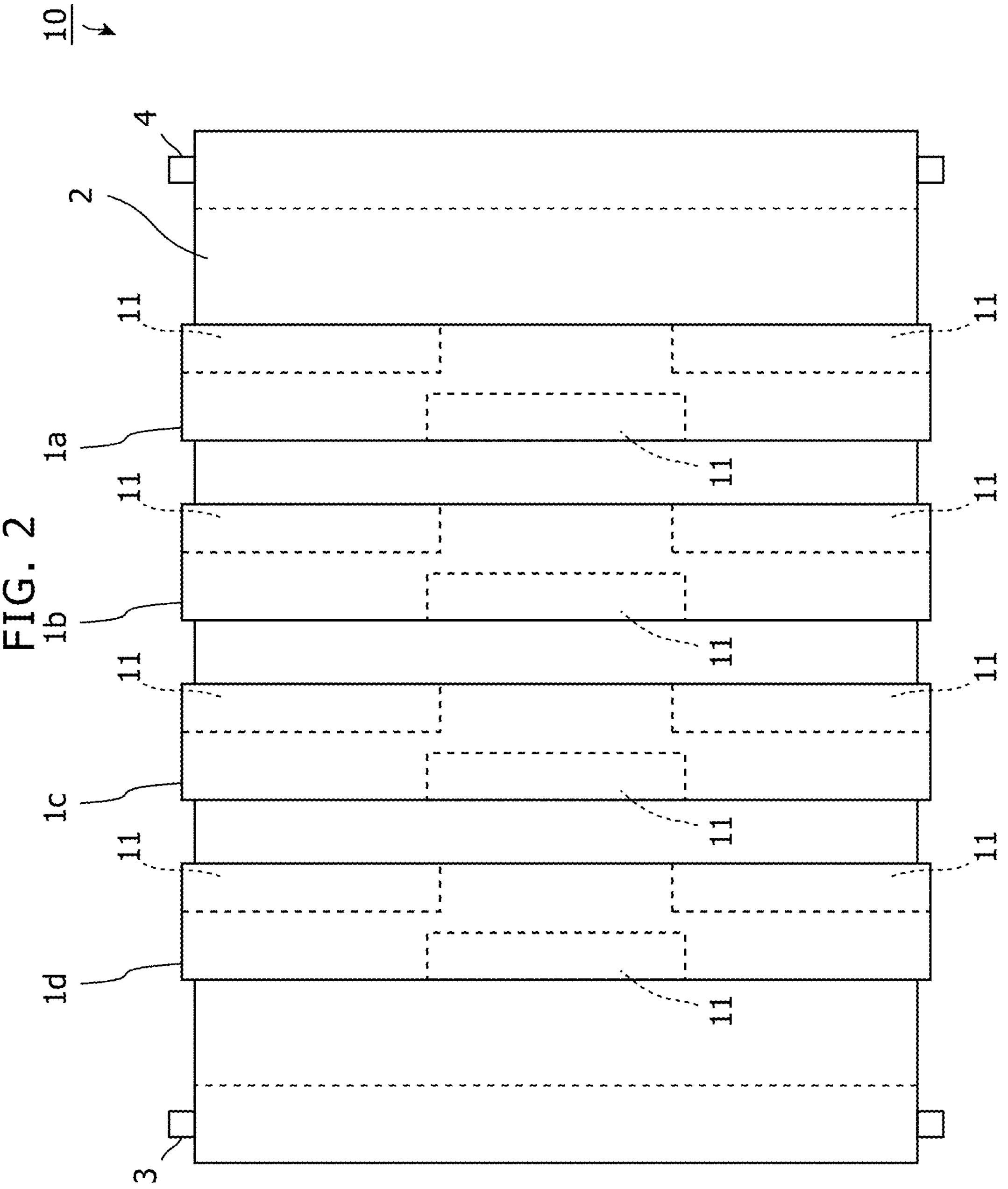
FIG. 2 shows a plane view of an example of recording heads 1*a* to 1*d* in the image forming apparatus 10 shown in FIG. 1.

FIG. 2 shows a plane view of an example of recording heads 1*a* to 1*d* in the image forming apparatus 10 shown in FIG. 1. As shown in FIG. 2, for example, in this embodiment, each of the inkjet recording units 1*a*, 1*b*, 1*c* and 1*d* includes plural (here, three) head units 11. The head units 11 are arranged along a primary scanning direction, and are capable of being mounted to and demounted from a main body of the image forming apparatus. Each of the recording heads 1*a*, 1*b*, 1*c* and 1*d* may include only one head unit 11. The head unit 11 of the inkjet recording unit 1*a*, 1*b*, 1*c* or 1*d* includes 2-dimensionally arranged nozzles corresponding to ejection positions arranged in a primary scanning direction, and ejects ink corresponding to the image to be printed using the nozzles.

The sheet transportation unit 10*b* transports the print sheet to the print engine 10*a* along a predetermined transportation path, and transports the print sheet after printing from the print engine 10*a* to a predetermined output destination (here, an output tray 10*c* or the like).

The sheet transportation unit 10*b* includes a main sheet transportation unit 10*b*1 and circulation a sheet transportation unit 10*b*2. In duplex printing, the main sheet transportation unit 10*b*1 transports to the print engine 10*a* a print sheet to be used for printing of a first-surface page image, and the circulation sheet transportation unit 10*b*2 transports the print sheet from a posterior stage of the print engine 10*a* to a prior stage of the print engine 10*a* with detaining a predetermined number of print sheets.

In this embodiment, the main sheet transportation unit 10*b*1 includes (a) a circular-type transportation belt 2 that is arranged so as to be opposite to the print engine 10*a* and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6*a*.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1*a* to 1*d* in turn, and on the print sheet, images of respective colors are printed by the inkjet recording units 1*a* to 1*d*. Subsequently, after the color printing, the print sheet is outputted by the output roller pairs 6 and 6*a* to an output tray 10*c* or the like.

Further, the main sheet transportation unit 10*b*1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2.

When performing duplex printing, the circulation sheet transportation unit 10*b*2 returns the print sheet from a predetermined position in a downstream side of the print engine 10*a* to a predetermined position in an upstream side of the print engine 10*a* (here, to a predetermined position in an upstream side of a line sensor 31 mentioned below). The circulation sheet transportation unit 10*b*2 includes a transportation roller 41, and a switch back transportation path 41*a* that reverses a movement direction of the print sheet in order to change a surface that should face the print engine 10*a* among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side edges) of the print sheet. For example, the line sensor 31 is a CIS (Contact Image Sensor). In this embodiment, the line sensor 31 is arranged at a position between the registration roller 28 and the print engine 10*a*.

The sheet detecting sensor 32 is an optical sensor that detects that a front end of the print sheet SH1 or SH2 passes through a predetermined position on the transportation path. The line sensor 31 detects the positions of the both side end edges at a time point that the front end of the print sheet SH1 or SH2 is detected by the sheet detecting sensor 32.

For example, as shown in FIG. 1, the print engine 10*a* is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10*b*2 transports the print sheet from the downstream side of the print engine 10*a* to the upstream side of the line sensor 31 with changing an orientation of the print sheet in a switch back manner.

Figure 3:
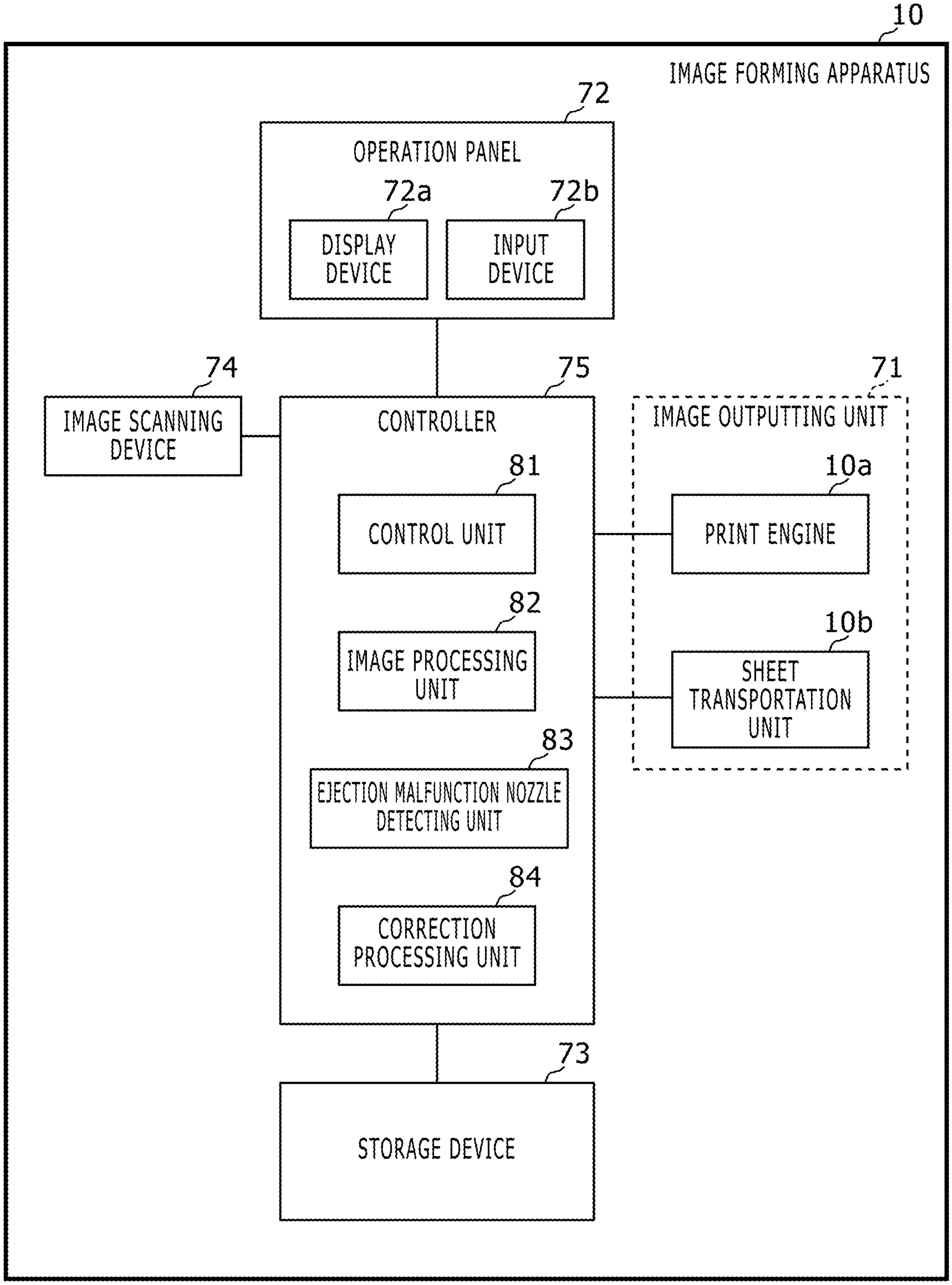
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device 72*a* such as a liquid crystal display and an input device 72*b* such as a hard key and/or a touch panel, and displays sorts of messages for a user using the display device 72*a* and receives a user operation using the input device 72*b*.

The storage device 73 is a non-volatile storage device (flash memory, hard disk drive or the like) in which data, a program and the like have been stored that are required for control of the image forming apparatus 10.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, an ejection malfunction nozzle detecting unit 83, and a correction processing unit 84.

The control unit 81 controls the image outputting unit 71 (the print engine 10*a*, the sheet transportation unit 10*b* and the like), and thereby performs a print job requested by a user. In this embodiment, the control unit 81 causes the image processing unit 82 to perform a predetermined image process, and controls the print engine 10*a* (the head units 11) and causes the head units 11 to eject ink and thereby forms a print image on a print sheet. The image processing unit 82 performs a predetermined image process such as RIP (Raster Image Processing), color conversion, halftoning and/or the like for image data of a printing image.

Specifically, the control unit 81 causes the print engine 10*a* to print a user document image based on printing image data specified by a user.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process. Specifically, in the automatic centering function, the control unit 81 changes a depicting position of the image to be printed, in a primary scanning direction by a difference between a reference center position of the print engine 10*a* and the actual sheet center position. In this embodiment, because the nozzles of the recording heads 1*a* to 1*d* do not move, a nozzle corresponding to each pixel in the image to be printed is changed correspondingly to the depicting position of the image to be printed.

As mentioned, the control unit 81 determines nozzles corresponding to the image to be printed (i.e. a nozzle corresponding to each pixel) (here, correspondingly to a position of a print sheet), and causes the recording heads 1*a* to 1*d* to eject ink from the determined nozzles.

The ejection malfunction nozzle detecting unit 83 (*a*) causes the recording head to print a test pattern on a print sheet using the recording head 1*a*, 1*b*, 1*c* or 1*d*, and (b) detects an ejection malfunction nozzle on the basis of a scanned image of the test pattern. Further the ejection malfunction nozzle detecting unit 83 stores into the storage device 73 ejection malfunction nozzle data (nozzle number or the like) that indicates the detected ejection malfunction nozzle.

Figure 4:
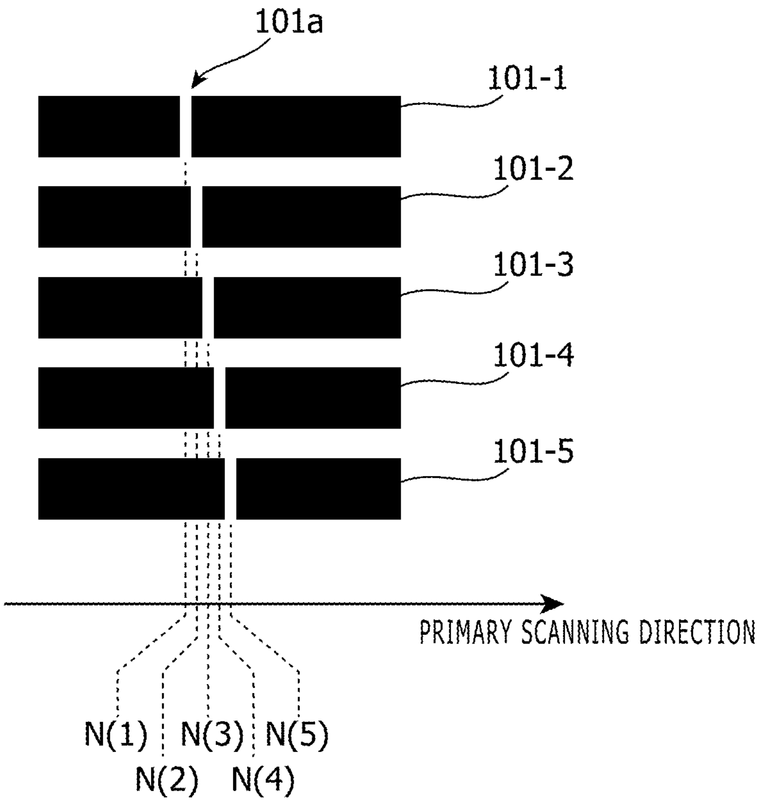
FIG. 4 shows an example of a test pattern printed in the image forming apparatus 10 shown in FIGS. 1 to 3.

FIG. 4 shows an example of a test pattern printed in the image forming apparatus 10 shown in FIGS. 1 to 3. As shown in FIG. 4 for example, this test pattern includes plural test pattern images 101-1 to 101-M (in FIG. 4, M=5) of a line shape or a band shape such that in each of the plural test pattern images a dot is not formed at a dot position of a target nozzle by setting the target nozzle as a non ejection nozzle. The target nozzles N(1) to N(M) of the plural test pattern images 101-1 to 101-M are sequentially shifted by one nozzle in a primary scanning direction as shown in FIG. 4 for example. Therefore, positions of blank lines 101*a* in the plural test pattern images 101-1 to 101-M are sequentially shifted by one dot.

Further, a scanned image of the aforementioned test pattern is acquired using the line sensor 31 or the image scanning device 74. If the line sensor 31 scans an image of the test pattern, the print sheet on which the test pattern has been printed by the print engine 10*a* is transported to a position of the line sensor 31 using the circulation transportation unit 10*b*2.

Further, in this embodiment, a resolution of the aforementioned scanned image (i.e. scan resolution) is lower than a resolution of the test pattern printed on the print sheet using the recording head 1*a*, 1*b*, 1*c* or 1*d* (i.e. print resolution). For example, the resolution of the aforementioned scanned image is set to be equal to or less than one quarter of the print resolution. For example, when the print resolution is 1200 dpi, the resolution of the aforementioned scanned image is 300 dpi.

Further, the ejection malfunction nozzle detecting unit 83 determines an ejection malfunction nozzle on which ejection deviation occurs, on the basis of density decreasing amounts of respective density decrease parts in the plural test pattern images in the aforementioned scanned image.

Specifically, the ejection malfunction nozzle detecting unit 83 determines as an ejection malfunction nozzle on which ejection deviation occurs a nozzle between a position of the target nozzle in a test pattern image of which the density decreasing amount is largest and a position of the target nozzle in a test pattern image of which the density decreasing amount is smallest.

Figure 5:
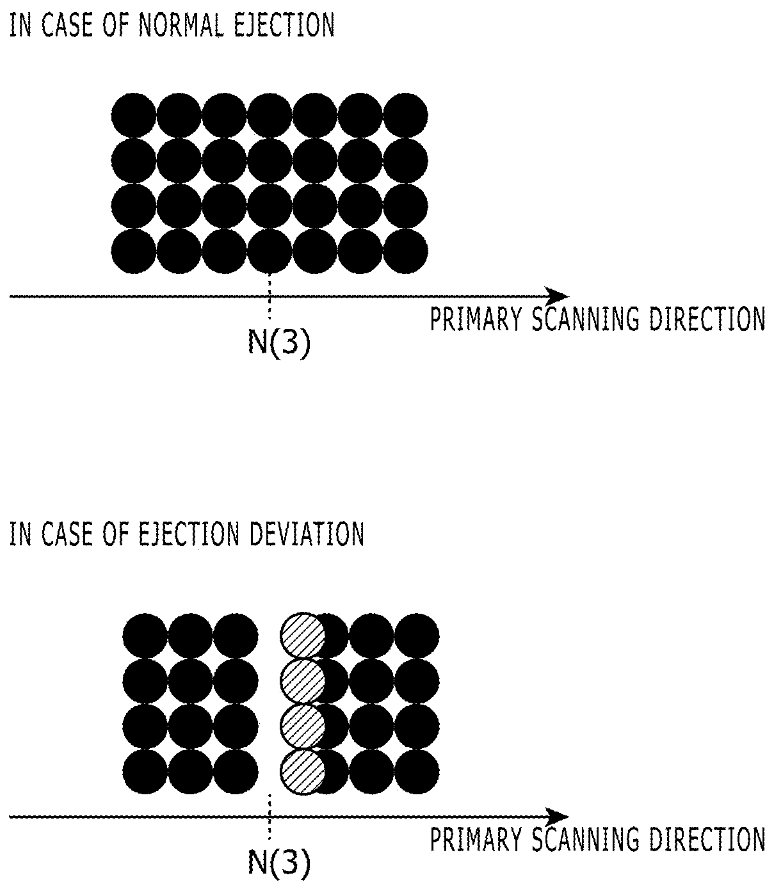
FIG. 5 shows a diagram that explains ejection deviation.

FIG. 5 shows a diagram that explains ejection deviation. For example, as shown in FIG. 5, regarding a nozzle on which ejection deviation occurs, a hitting position of an ink droplet ejected by the nozzle is shifted from a hitting position of normal ejection by a width less than one dot. FIG. 5 indicates a case that ejection deviation occurs on the nozzle N(3).

Figure 6:
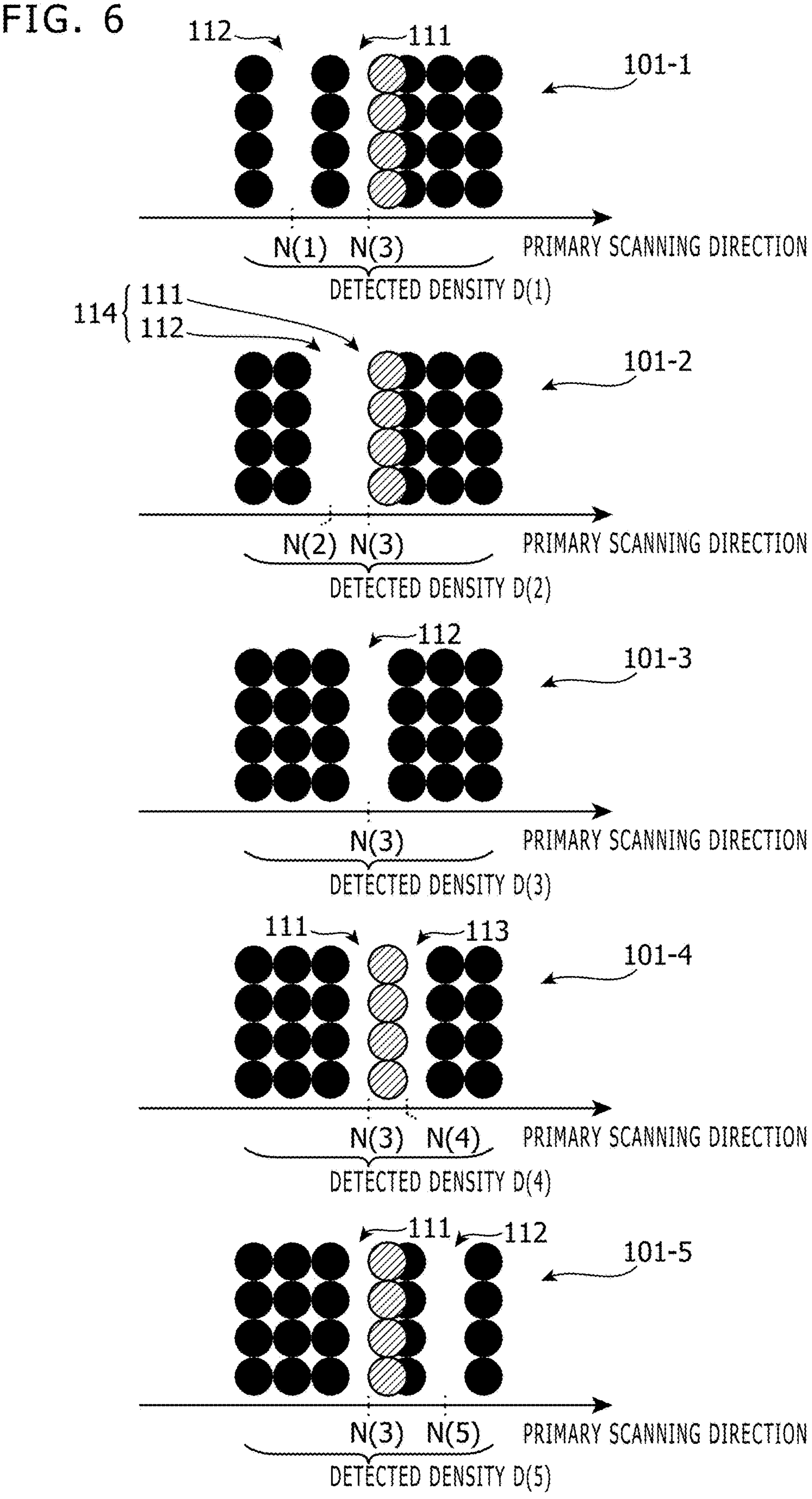
FIG. 6 shows a diagram that indicates an example of test pattern images 101-1 to 101-M printed in a case that ejection deviation occurs on a nozzle.

FIG. 6 shows a diagram that indicates an example of test pattern images 101-1 to 101-M printed in a case that ejection deviation occurs on a nozzle.

If ejection deviation occurs on the nozzle N(3) shown in FIG. 5, then as shown in FIG. 6 for example, in the test pattern images 101-1, 101-2, 101-4 and 101-5 for which the nozzle N(3) performs ink ejection, blank lines 111 of a width less than one dot appear at a position corresponding to the nozzle N(3).

Further, if the nozzle N(3) on which ejection deviation occurs is a nozzle N(i) that is set as a non ejection nozzle (target nozzle), a blank line 112 of a one-dot width appears at a position corresponding to the nozzle N(3).

Furthermore, if a nozzle other than the nozzle N(3) on which ejection deviation occurs and adjacent nozzles of the nozzle N(3) (i.e. the nozzles N(2) and N(4) corresponding to dot positions adjacent to a dot position of the nozzle N(3)) is set as a non ejection nozzle (in FIG. 6, i=1, 5, that is, in the test pattern images 101-1 and 101-5), blank lines 112 of a one-dot width appear at positions corresponding to the nozzles N(i) independently from the aforementioned blank line 111.

Furthermore, if a nozzle located in an ink droplet deviation direction (ejection deviation direction) (here, N(4)) among the adjacent nozzles (here, the nozzles N(2) and N(4)) is set as a non ejection nozzle, a blank line 113 of a width less than one dot appears at a position corresponding to the nozzle N(4). Here, the larger the ink droplet deviation (deviation width) is, the narrower the width of this blank line 113 is.

Meanwhile, if a nozzle located in opposite to an ink droplet deviation direction (ejection deviation direction) (here, N(2)) among the adjacent nozzles (here, the nozzles N(2) and N(4)) is set as a non ejection nozzle, a blank line 112 of a one-dot width appears at position corresponding to the nozzle N(2) regardless of the ink droplet deviation (deviation width). In this case, in the primary scanning direction, the blank line 111 and the blank line 112 are close to each other and thereby the blank lines 111 and 112 are merged in a single blank line 114. Here, a width of the blank line 114 is a total of a width of the blank line 111 and a width of the blank line 112.

Regarding sections in the test pattern images 101-1 to 101-5 shown in FIG. 6 (i.e. sections of a predetermined width that includes a position corresponding to the nozzle N(3) on which ejection deviation occurs), when densities of pixels (i.e. pixel values) corresponding to the sections in a scanned image of the test pattern is referred to as D(1) to D(5), the following relational expression is satisfied.

$$D(2) > D(1) > D(5) \geq D(3) > D(4)$$

Therefore, in a case shown in FIGS. 5 and 6, the nozzle N(3) is located at a position between a position of the target nozzle N(4) in a test pattern image 101-4 of which a density decreasing amount (decreasing amount from a normal density when ejection deviation does not occur) is largest and a position of the target nozzle N(2) in the test pattern image 101-2 of which the density decreasing amount is smallest, and therefore the nozzles N(3) is determined as an ejection malfunction nozzle of ejection deviation.

Returning to FIG. 3, the correction processing unit 84 performs a correction process (here, as a hardware process) corresponding to a correction target nozzle for an image to be printed. In this correction process, for example, image data (pixel value) of a pixel corresponding to an ejection malfunction nozzle is corrected to a value of non ink ejection, and image data (pixel value) of a pixel adjacent to the ejection malfunction nozzle is corrected such that a density of this pixel is increased.

The following part explains a behavior of the image forming apparatus 10.

(a) Setting of a Nozzle as a Target of the Correction Process

The ejection malfunction nozzle detecting unit 83 performs a detecting action of an ejection malfunction nozzle at a predetermined timing. In the detecting action of an ejection malfunction nozzle, the ejection malfunction nozzle detecting unit 83 firstly, (a) using the control unit 81, causes the image outputting unit 71 to print the aforementioned test pattern (the aforementioned plural test pattern images 101-1 to 101-M) with a predetermined print resolution on a print sheet, and acquires with a predetermined scan resolution a scanned image (RGB image data, grayscale image data or the like) of the test pattern printed on the print sheet.

Subsequently, the ejection malfunction nozzle detecting unit 83 determines density decreasing amounts of the plural test pattern images 101-1 to 101-M on the basis of primary-scanning-directional density distributions of a scanned image of the test pattern (i.e. on the basis of primary-scanning-directional density of distributions scanned images corresponding to the test pattern images 101-1 to 101-M), selects a test pattern image 101-*j* on the basis of the determined density decreasing amounts as mentioned (in the aforementioned example, j=3), and determines a nozzle N(j) corresponding to the test pattern image 101-*j* as an ejection malfunction nozzle on which ejection deviation occurs.

Upon the detection of the ejection malfunction nozzle, the ejection malfunction nozzle detecting unit 83 stores into the storage device 73 ejection malfunction nozzle data (identification information such as nozzle number) of the determined ejection malfunction nozzle.

As mentioned, nozzles as correction targets are set in the ejection malfunction nozzle data.

(b) Behavior for Printing

When receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data.

In this process, the correction processing unit 84 reads the ejection malfunction nozzle data from the storage device 73 and determines an ejection malfunction nozzle before starting the printing; and upon detecting a position of a print sheet using the line sensor 31, (a) determines a nozzle corresponding to each pixel in the aforementioned image, (b) determines correction target nozzles used for the aforementioned image, and (c) performs the correction process for the correction target nozzles. Consequently, in this image, the correction process is performed for a part corresponding to the correction target nozzles (and adjacent nozzles in the primary scanning direction to the ejection malfunction nozzle). Subsequently, the control unit 81 performs the aforementioned printing on the basis of the image data after the correction process.

As mentioned, in Embodiment 1, the ejection malfunction nozzle detecting unit 83 (*a*) causes the recording head to print a test pattern on a print sheet using the recording head 1*a*, 1*b*, 1*c* or 1*d*, and (b) detects an ejection malfunction nozzle on the basis of a scanned image of the test pattern. This test pattern includes plural test pattern images of a line shape or a band shape such that in each of the plural test pattern images a dot is not formed at a dot position of a target nozzle by setting the target nozzle as a non ejection nozzle, and the target nozzles of the plural test pattern images are sequentially shifted by one nozzle in a primary scanning direction. Further, the ejection malfunction nozzle detecting unit 83 determines an ejection malfunction nozzle on which ejection deviation occurs, on the basis of density decreasing amounts of respective density decrease parts in the plural test pattern images in the scanned image.

Consequently, an ejection malfunction nozzle on which ejection deviation occurs is detected individually and correctly. In particular, even if a resolution of the scanned image is lower than the print resolution, an ejection malfunction nozzle on which ejection deviation occurs is detected individually and correctly.

FIG. 7 shows a diagram that explains an example of the number of ejection deviation nozzles correctly determined by the image forming apparatus according to an embodiment of the present disclosure.

In an example shown in FIG. 7, the print resolution is 1200 dpi, the resolution of the scanned image is 300 dpi, and the number of nozzles of ejection deviation in a range in the primary scanning direction in a printed test pattern is 86; and the image forming apparatus according to this embodiment correctly determined 77 nozzles (89.5%) among the 86 nozzles.

Contrarily, in comparative examples #1 and #2, ejection deviation nozzles are determined on the basis of a density decreasing amount of an ordinary test pattern of a band shape, the comparative example #1 sets a resolution the scanned image as 1200 dpi, and the comparative example #2 sets a resolution the scanned image as 300 dpi. In the comparative example #1, among 90 ejection deviation nozzles in a range in the primary scanning direction in a printed test pattern, 82 nozzles (91.1%) were correctly detected; and in the comparative example #2, among 76 ejection deviation nozzles in a range in the primary scanning direction in a printed test pattern, 23 nozzles (30%) were correctly detected.

Thus, even if the resolution of the scanned image is low, the image forming apparatus according to this embodiment achieved a detection ratio (89.5%) similar to a detection ratio when the resolution of the scanned image is high (i.e. the same as the print resolution). In addition, in the image forming apparatus according to this embodiment, required time for it is similar to the comparative example #1.

Embodiment 2

In Embodiment 2, the ejection malfunction nozzle detecting unit 83 causes the recording head to print another test pattern (e.g. a band-shaped test pattern having a single density) on another print sheet using the recording head 1*a*, 1*b*, 1*c* or 1*d* prior to printing the test pattern described in Embodiment 1, detects a density defect due to the ejection malfunction nozzle in a scanned image of the other test pattern, and sets a range of a position of the target nozzle in the primary scanning direction on the basis of a position of the detected density defect.

Thus, the ejection malfunction nozzle detecting unit 83 determines a rough position of an ejection deviation nozzle on the basis of this other test pattern, and sets a predetermined width around this rough position as a center as the aforementioned range of a position of the target nozzle.

Other parts of the configuration and behaviors of the image forming apparatus in Embodiment 2 are identical or similar to those in Embodiment 1, and therefore not explained here.

Embodiment 3

In Embodiment 3, the ejection malfunction nozzle detecting unit 83 (*a*) causes the recording head to print another test pattern (e.g. a test pattern including vertical lines of a one-dot width respectively corresponding to the plural nozzles) on another print sheet using the recording head 1*a*, 1*b*, 1*c* or 1*d* prior to printing the test pattern described in Embodiment 1 and determines an ejection malfunction nozzle of non ejection on the basis of a density distribution of a scanned image of the other test pattern, and (b) determines the ejection malfunction nozzle on which ejection deviation occurs while excluding the determined ejection malfunction nozzle of non ejection. Consequently, a detection action of ejection deviation nozzles is not performed for ejection malfunction nozzles of non ejection, and therefore, it is restrained that an ejection malfunction nozzle of non ejection is detected as an ejection malfunction nozzle of ejection deviation in error.

Other parts of the configuration and behaviors of the image forming apparatus in Embodiment 3 are identical or similar to those in Embodiment 1 or 2, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:

a recording head configured to eject ink corresponding to an image to be printed, using arranged nozzles;

a control unit configured to determine nozzles corresponding to the image to be printed and cause the recording head to eject ink from the nozzles; and an ejection malfunction nozzle detecting unit configured to (a) cause the recording head to print a test pattern on a print sheet using the recording head, and (b) detect an ejection malfunction nozzle on the basis of a scanned image of the test pattern;

wherein the test pattern includes plural test pattern images of a line shape or a band shape such that in each of the plural test pattern images a dot is not formed at a dot position of a target nozzle by setting the target nozzle as a non ejection nozzle;

the target nozzles of the plural test pattern images are sequentially shifted by one nozzle in a primary scanning direction;

the ejection malfunction nozzle detecting unit determines an ejection malfunction nozzle on which ejection deviation occurs, on the basis of density decreasing amounts of respective density decrease parts in the plural test pattern images in the scanned image; and the ejection malfunction nozzle detecting unit determines as an ejection malfunction nozzle on which ejection deviation occurs a nozzle between a position of the target nozzle in a test pattern image of which the density decreasing amount is largest and a position of the target nozzle in a test pattern image of which the density decreasing amount is smallest.

2. The image forming apparatus according to claim 1, wherein the ejection malfunction nozzle detecting unit causes the recording head to print another test pattern on another print sheet using the recording head prior to printing the test pattern, detects a density defect due to the ejection malfunction nozzle in a scanned image of the other test pattern, and sets a range of a position of the target nozzle in the primary scanning direction on the basis of a position of the detected density defect.

3. The image forming apparatus according to claim 1, wherein the ejection malfunction nozzle detecting unit (a) causes the recording head to print another test pattern on another print sheet using the recording head prior to printing the test pattern and determines an ejection malfunction nozzle of non ejection on the basis of a density distribution of a scanned image of the other test pattern, and (b) determines the ejection malfunction nozzle on which ejection deviation occurs while excluding the determined ejection malfunction nozzle of non ejection.

4. The image forming apparatus according to claim 1, wherein a resolution of the scanned image is lower than a resolution of the test pattern printed on the print sheet using the recording head.

* * * * *